Patented Jan. 23, 1923.

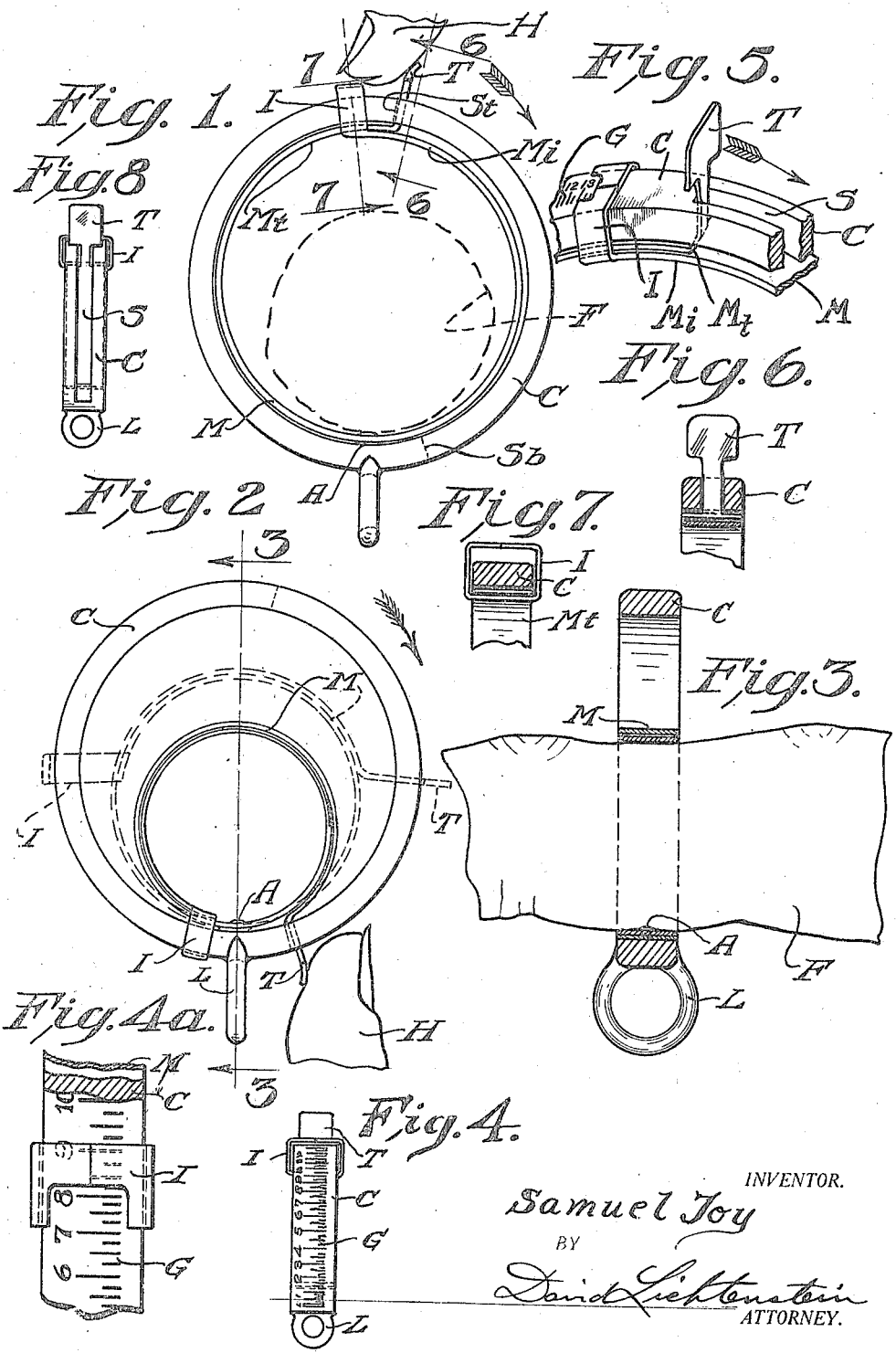

1,442,985

UNITED STATES PATENT OFFICE.

SAMUEL TOY, OF BOSTON, MASSACHUSETTS.

FINGER-MEASURING DEVICE.

Application filed March 26, 1921. Serial No. 455,756.

*To all whom it may concern:*

Be it known that I, SAMUEL TOY, a subject of the Russian Government, and resident of Boston, in the county of Suffolk and State of Massachusetts, have invented a new and useful and improved Finger-Measuring Device, of which the following is a specification, reference being had to the accompanying sheet of drawing, forming part thereof.

My invention relates to a finger measuring device, and has for its object to provide a simple and reliable means for indicating the size of ring required to fit the finger being measured in the device.

Another object of the invention is to provide a compact and handy measuring device designed to accommodate the insertion of a finger therein to be measured thereby, and provided with yieldable means which may be readily and rapidly adjusted and contracted to encircle the finger and to indicate the size of ring required to fit the same; said yieldable means being further adapted to automatically expand back to the normal position immediately upon being released by the operator after noting the indicated reading of the device.

Other objects and advantages of the invention will be gathered from the description following herein and considered in connection with the accompanying drawing wherein the invention is shown embodied.

The terms employed herein are used in the generic and descriptive sense to designate the elements illustrated, and are therefore not primarily intended as terms of limitation.

In order to illustrate my invention I have shown an embodiment thereof in the accompanying drawing, wherein:

Fig. 1 represents an enlarged elevational view of the device showing the same in the normal position and ready to make the measurement of the finger inserted therein;

Fig. 2 represents a similar view to Fig. 1, but shows the measuring element of the device contracted to the extreme position;

Fig. 3 represents a sectional view taken on line 3—3 on Fig. 2, showing the device fitted to a finger which is being measured therein;

Fig. 4 represents a left end view of the device shown in Figs. 1 and 2, showing the registering side thereof;

Fig. 4ª represents an enlarged portion of the registering side of the device;

Fig. 5 represents a perspective view of the top of the device, showing the yieldable, measuring element of the device set in the extreme expanded or normal position corresponding to the setting shown in Fig. 1;

Fig. 6 represents a sectional view taken on line 6—6 of Fig. 1;

Fig. 7 represents a sectional view taken on line 7—7 on Fig. 1; and

Fig. 8 represents a right side elevational view of the device.

Like reference characters refer to like parts throughout the several views of the drawing.

The letter C represents the rigid frame member or casing ring which is provided on one side with the slot S which reaches from $S_t$ at the top of the casing ring to $S_b$ at the bottom of the same; on the other side with the graduated scale G; and on the bottom with the loop L which may be made integral with the casing ring C as shown, or separate therefrom and rigidly secured thereto in any suitable manner for permitting the engagement of a chain or cord therewith. M represents the yieldable and overlapped band or measuring element of the device which is made of suitable yieldable material, as spring steel for example, to afford the measuring element necessary yielding quality to contract and expand within the casing ring C, as the drawing indicates and as may be understood to be required by the operating principles of the device. Said measuring element is normally expanded to fit substantially concentric within the interior of the casing ring C, as shown in Fig. 1, and is securely anchored at an intermediate point A thereof to the ring casing, as by being riveted thereto, as shown, or otherwise, according as may be desired. The ends $M_i$ and $M_t$ of said measuring element M are preferably overlapped, as shown in Fig. 1, the inner follower end $M_i$ being provided with the indicator loop I which slidably embraces the measuring element M and the registering side of the casing ring C, as indicated in Figs. 1, 2, 5 and 7. The leader end $M_t$ of the measuring element M is provided with the hand trigger T which is exposed through the slot S to the outside of the casing ring C to permit the engagement thereof by the hand H of the operator, as shown in Figs. 1 and 2 for manipulating the device thereby, as may be understood therefrom. Said indicator loop I and said trigger T may be made integral with the measuring element M, as shown, or separate therefrom and rigidly secured thereto in any suitable manner and according as may be desired.

From the aforesaid description of the parts of the device in detail, it will be understood that the device normally assumes the full open and expanded position shown in Fig. 1. To measure the size of ring required for a particular finger, as F for example, the latter is inserted through the device, as shown in Fig. 3, while the measuring element is allowed to remain in its normal and full open setting. The operator then moves the trigger T around the slot S in the direction of the feathered arrows indicated in Figs. 1, 2 and 5, which operation contracts the yieldable measuring element M, causing the indicator loop I to simultaneously move with the trigger T but in the opposite direction and along the graduated scale G provided on the casing ring C. The overlapped setting of the measuring element ends, namely, $M_i$ and $M_t$ which are each slidably anchored to the casing ring C, provides a cam action therebetween, that is to say, the embracing or leader element $M_t$ serves as a cam against the other indicator loop or follower end $M_i$ of the yieldable measuring element M and serves to compel the latter end to function correspondingly in accordance with the setting of the trigger T. The latter is thus moved in the slot sufficiently to contract the measuring element so that the same becomes wrapped around the finger F being measured, as shown in Fig. 3, when the advancing indicator loop I will show the size of ring required on the graduated scale G, as shown in Fig. 4ª. The operator noting the reading may then release the finger F from the device by permitting the trigger T to return to its normal position, which it will do because of the normal expansion and spring feature embodied in the measuring element.

It will thus be noted that the within finger measuring device affords a simple and reliable gauge for jewelers, which may be carried on a key ring or chain to be accessible, and by means of which they may readily and conveniently determine the size of ring required to fit the finger of the purchaser.

Having thus described my invention in detail, what I claim as new is:

1. A finger measuring device, comprising a ring member having a normally expanded and overlapped band element positioned within said ring member and anchored at an intermediate point thereof to said ring member, said band element normally setting adjacently against said ring member and having the ends thereof provided with ring engaging members which slidably engage said ring member; means for contracting said band element to encircle the finger being measured in the device; said device being provided with means for indicating the degree of contraction of said band element.

2. A finger measuring device, comprising a fixed frame member having a graduated ring scale provided thereon; and a yieldable band member secured within said frame member and adapted to contract and expand diametrically therein, having the middle portion thereof anchored to said frame member and the ends thereof overlapped to yield a leading end and a following end, which following end is controlled by the actions of the leading end, the latter end having hand engaging means slidably engaging with the frame member for manipulating purposes and the follower end having indicator means slidably embracing said leading end of said yieldable band member and said frame member for registering with the graduated ring scale provided thereon to indicate the size of ring required to correspond to the particular setting of said yieldable band member.

3. A finger measuring device for gauging ring sizes, comprising a rigid outer ring member having a graduated ring scale thereon, and a yieldable inner band member secured at an intermediate point thereof to said outer ring member and having a leader and follower end adjacently overlapped and adapted to slidably engage with said outer ring, said yieldable inner band normally spreading against said outer member; a trigger member provided on the leader end of said inner band and projecting beyond the outer band for manipulating the inner band therein; and indicator means provided on the follower end of said inner band, adapted to slidably embrace the leader end of said inner band and said outer ring for registering with the graduated scale provided on the latter.

4. A finger measuring device, comprising a circular shaped rigid outer member, having a graduated scale of ring sizes provided on one side thereof and a slotted aperture on the opposite side thereof; and a yieldable circular shaped band member fitted within said outer member, having the ends thereof overlapped, the outer end serving as the leading end which is provided with a leader trigger slidably engaging the slotted aperture of said outer member and the inner end serving as the following end which is provided with an indicator loop which slidably embraces the leading end of said yieldable band member and said outer member and is adapted to register with the scale provided on the latter, said yieldable band member being anchored at an intermediate point to said outer member and normally adapted to expand to adjacently fit said outer member and otherwise to contract diametrically in accordance with the position of the leader trigger in said outer member.

5. A finger measuring device, comprising a rigid frame member having a graduated ring scale provided thereon on one side thereof and a slotted aperture on the other side thereof; and a yieldable circular shaped and expanded band member, having the ends thereof overlapped to provide a leader end and a follower end and the intermediate portion thereof anchored to said rigid frame member, said leader end having a trigger slidably fitted within said slotted aperture of said frame member and said follower end having an indicator member slidably embracing said leader end of said yieldable band member and said frame member and adapted to ride along the graduated scale section of said frame member for indicating the size of ring required by the particular setting of said yieldable band as effected by the manipulation of said trigger in the aperture of said frame member.

In witness whereof, I hereunto affix my signature, this twenty-fourth day of March, 1921.

SAMUEL TOY.

Witnesses:
DAVID LICHTENSTEIN,
B. H. CHERTOK.